US009047254B1

(12) United States Patent
Kobyakov et al.

(10) Patent No.: US 9,047,254 B1
(45) Date of Patent: Jun. 2, 2015

(54) DETECTION AND VALIDATION OF EXPANSION TYPES OF EXPANDABLE CONTENT ITEMS (75) Inventors: Pavel Kobyakov, Waterloo (CA); Ksenia Shubina, Vaughan (CA)

(73) Assignee: Google Inc., Mountain View, CA (US)

( * ) Notice: Subject to any disclaimer, the term of this patent is extended or adjusted under 35 U.S.C. 154(b) by 344 days.

(21) Appl. No.: 13/541,879

(22) Filed: Jul. 5, 2012

(51) Int. Cl.
*G06F 17/00* (2006.01)
*G06F 17/21* (2006.01)

(52) U.S. Cl.
CPC ................................. *G06F 17/211* (2013.01)

(58) Field of Classification Search
CPC .............. G06F 17/211; G06F 17/2247; G06F 17/2294; G06F 17/30896
USPC .......... 715/234, 243, 244, 245, 246, 247, 255
See application file for complete search history.

(56) References Cited

U.S. PATENT DOCUMENTS

| | | | | |
|---|---|---|---|---|
| 6,115,690 | A * | 9/2000 | Wong ............................. | 705/7.27 |
| 6,615,251 | B1 | 9/2003 | Klug | |
| 6,725,287 | B1 * | 4/2004 | Loeb et al. ........................ | 710/8 |
| 6,973,436 | B1 | 12/2005 | Shkedi | |
| 7,610,560 | B2 * | 10/2009 | Horvitz et al. ................ | 715/764 |
| 7,746,343 | B1 * | 6/2010 | Charaniya et al. ............ | 345/428 |
| 7,853,492 | B1 * | 12/2010 | Kirklin et al. ................... | 705/28 |
| 7,979,382 | B2 * | 7/2011 | Guyan et al. .......................... | 1/1 |
| 8,237,937 | B2 | 8/2012 | Sugiyama | |
| 8,350,849 | B1 * | 1/2013 | Jones et al. .................... | 345/419 |
| 8,352,539 | B2 * | 1/2013 | Mizuno ......................... | 709/201 |
| 8,462,949 | B2 * | 6/2013 | Anderson et al. ............. | 380/252 |
| 8,510,167 | B2 | 8/2013 | Lisbakken | |
| 8,578,057 | B2 | 11/2013 | Omar | |
| 8,606,723 | B2 * | 12/2013 | Seubert et al. ................ | 705/348 |
| 8,694,632 | B1 | 4/2014 | Shubina et al. | |
| 8,751,304 | B1 | 6/2014 | Kobyakov et al. | |
| 2002/0042786 | A1 | 4/2002 | Scarborough | |
| 2002/0046199 | A1 | 4/2002 | Scarborough | |
| 2002/0152305 | A1 | 10/2002 | Jackson | |
| 2002/0169803 | A1 * | 11/2002 | Sampath et al. ............. | 707/513 |
| 2003/0137512 | A1 * | 7/2003 | Hoehn et al. .................. | 345/428 |
| 2003/0182310 | A1 * | 9/2003 | Charnock et al. .......... | 707/104.1 |
| 2003/0182394 | A1 * | 9/2003 | Ryngler et al. .............. | 709/217 |
| 2004/0193388 | A1 * | 9/2004 | Outhred et al. .................... | 703/1 |
| 2004/0205711 | A1 * | 10/2004 | Ishimitsu et al. ............. | 717/116 |
| 2006/0074730 | A1 * | 4/2006 | Shukla et al. ..................... | 705/8 |
| 2007/0150387 | A1 * | 6/2007 | Seubert et al. .................. | 705/31 |
| 2007/0299857 | A1 | 12/2007 | Gwozdz et al. | |
| 2008/0288342 | A1 | 11/2008 | Ingleshwar | |

(Continued)

FOREIGN PATENT DOCUMENTS

WO WO0109332 A9 10/2001

OTHER PUBLICATIONS

How do iframe busters for expandable ads work?; javascript—How do iframe busters for expandable ads work?—Stack Overflow; http://stackoverflow.com/questions/5553469/how-do-iframe-busters-for-expandable-ads-work; Aug. 15, 2012; 3 pages.

(Continued)

*Primary Examiner* — Laurie Ries
(74) *Attorney, Agent, or Firm* — Fish & Richardson P.C.

(57) ABSTRACT

This specification describes methods, systems, and apparatus, including computer programs encoded on a computer-readable storage device, for detecting and validating expansion types of expandable content items.

20 Claims, 6 Drawing Sheets

(56) References Cited

U.S. PATENT DOCUMENTS

| | | | |
|---|---|---|---|
| 2009/0040246 A1* | 2/2009 | Miyasaka | 345/698 |
| 2009/0099901 A1 | 4/2009 | Sah et al. | |
| 2009/0187583 A1* | 7/2009 | Pape et al. | 707/100 |
| 2009/0299862 A1* | 12/2009 | Fan et al. | 705/14.73 |
| 2010/0082657 A1 | 4/2010 | Paparizos et al. | |
| 2010/0306249 A1* | 12/2010 | Hill et al. | 707/769 |
| 2010/0313129 A1* | 12/2010 | Hyman | 715/719 |
| 2011/0055685 A1 | 3/2011 | Jaquish et al. | |
| 2011/0071818 A1* | 3/2011 | Jiang | 704/8 |
| 2011/0153435 A1 | 6/2011 | Pisaris-Henderson | |
| 2011/0161990 A1 | 6/2011 | Smith et al. | |
| 2012/0101907 A1* | 4/2012 | Dodda | 705/14.73 |
| 2013/0238994 A1* | 9/2013 | Yurasits | 715/716 |
| 2013/0275901 A1* | 10/2013 | Saas et al. | 715/769 |
| 2013/0339896 A1* | 12/2013 | Shadle et al. | 715/777 |
| 2014/0164923 A1* | 6/2014 | Georgiev et al. | 715/716 |
| 2014/0164985 A1* | 6/2014 | Pimmel et al. | 715/784 |
| 2014/0240293 A1* | 8/2014 | McCaughan et al. | 345/175 |

OTHER PUBLICATIONS

Introducing expandable ads on AdSense sites—Inside AdSense; Inside AdSense Blog; http://adsense.blogspot.com/2009/03/introducing-expandable-ads-on-adsense.html; Aug. 14, 2012; Mar. 4, 2009; 8 pages.

Macro overview; dfp DoubleClick for Publishers; http://support.google.com/dfp_premium/bin/answer.py?hl=en&answer=1242718; Aug. 14, 2012; 7 pages.

Expanding Options in Expandable Ads; Jun. 4, 2009; Wegert, Tessa; ClickZ/Marketing News & Expert Advise; http://www.clickz.com/clickz/column/1699404/expanding-options-expandable-ads; Aug. 15, 2012; 3 pages.

Gilbert, David, "Set IFRAME height based on size of remotely loaded content", solidgone Blog, Mar. 13, 2010, XP055066250, Retrieved from the Internet: URL:http://solidgone.org/Set-IFRAME-height-based-onsize-of-remotely-loaded-content [retrieved on Jun. 11, 2013], abstract, 10 pages.

"Peters, 'Iframe loading techniques and performance', aaronpeters.nl, Dec. 20, 2010, on line at aaronpeters.nl/blog/iframeloading-techniques-performance?%3E", 11 pages.

* cited by examiner

DETECTION AND VALIDATION OF EXPANSION TYPES OF EXPANDABLE CONTENT ITEMS

BACKGROUND

This specification relates to information presentation.

Sponsored content (e.g. advertisements, deals or special offers) can be provided over the Internet to various user devices. For example, a web page can include slots in which sponsored content can be presented. These slots can be defined in the web page or defined for presentation with a web page, for example, along with search results or other content. Sponsored content can also be delivered through dedicated web portals or applications executing on the user devices.

Some content items are expandable. For example, a content item can be initially presented in an unexpanded form as a 728×90 pixel graphical item. When an expansion event occurs, an expanded view of 728×270 pixels can be presented. There are different types of expansion events for an expandable content item—these include an on-load event, a hover event, and a click event.

An on-load event occurs when the page is loaded in the user device, such as in a browser. Thus, when the page is loaded (or after a short delay after the page has loaded), the expandable content item will expand from its unexpanded state to its expanded state. A hover event occurs when a user interacts with the content item by "mousing over" or moving a cursor over the content item, sometimes for a predefined period of time, such as several seconds. In response to the hover event, the expandable content item will expand from its unexpanded state to its expanded state. Similarly, a click event occurs when a user selects the content item by "clicking on" the content item when the cursor is positioned over the content item.

An expandable content item may be configured to expand for only one of the events, or may be configured for a combination of events. The expansion capabilities of the expandable content item are stored in metadata and used, for example, for filtering the expandable content items during a selection process. To illustrate, a first publisher may not want content items that expand in response to an on-load event shown on its pages; a second publisher may only want content items that expand in response to a click event; and a third publisher may not want content items that expand in response to a hover event. The publishers specify these preferences in filter data stored at a content item delivery system to provide content items for publisher pages. The content item delivery system accesses the filter data when selecting content items for requests from user devices loading the publisher pages. Thus, for pages of the first publisher, the content item delivery system will not serve content items that expand in response to an on-load event, but will serve content items that expand in response to a hover event and/or a click event. Likewise, for pages of the second publisher, the content item delivery system will only serve content items that expand in response to a click event, and will not serve content items that expand in response to a hover event and/or an on-load event. Finally, for pages of the third publisher, the content item delivery system will not serve content items that expand in response to hover event, but will serve content items that expand in response to an on-load event and/or a click event.

The content item delivery system utilizes a manual review process to review the expansion characteristics of content items and their respective metadata to ensure that the metadata properly describes the expansion features of the content item. The review process is necessary to ensure that content items that are provided for publisher pages expand in a manner consistent with the publishers specifications. The review, however, is a labor intensive process.

SUMMARY

In general, one aspect of the subject matter described in this specification can be embodied in methods that include the actions of actions of selecting expandable content items, and for each expandable content item: selecting metadata describing features of the expandable content item, the metadata describing features including: dimension features specifying at least one of unexpanded display dimensions for the expandable content item in an unexpanded state and expanded display dimensions for the expandable content item in an expanded state, one or more specified expansion events for the expandable content item, each specified expansion event being one of a set of enumerated expansion events, each enumerated expansion event being an event for which the occurrence causes an expandable content item to expand from an unexpanded state to an expanded state, each specified expansion event being an event for which the expanding content item is specified to expand from the unexpanded state to the expanded state; rendering a resource that includes the expandable content item in a virtual machine instance; generating an occurrence of each of the enumerated expansion events in the virtual machine instance, and after the occurrence of each enumerated expansion event, determining whether the expandable content item expanded from the unexpanded state to the expanded state; validating the expandable content item only when the expandable content item expands from the unexpanded state to the expanded state for each specified expansion event, and does not expand from the unexpanded state to the expanded state for each enumerated expansion event that is not included in the one or more specified expansion events. Other embodiments of this aspect include corresponding systems, apparatus, and computer program products.

Particular embodiments of the subject matter described in this specification can be implemented so as to realize one or more of the following advantages. The automated review process reduces and/or eliminates the need for manual reviewers, which, in turn, reduces overhead costs of the content item delivery system. The automated review process also significantly reduces the overall review time, which, in turn, results in more timely deployment of the content items. The automated review process is less susceptible to error than the manual review process, and thus fewer instances of expandable content items that do not conform to their respective metadata expansion descriptions are encountered. This, in turn, leads to fewer instances of expandable content items being shown on publisher pages that do not conform to the publishers' specifications. The automated review process also facilities the re-evaluation of approved content items to ensure that the content items continue to perform as specified.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

The subject matter of this application provides an automated process for detecting and validating declared expansion types for expandable content items. A content item management system, such as an advertising exchange in the case of advertisements, stores metadata describing features of expandable content items that the content item management system serves. These features may include, for each content item, dimension features and expansion events. The dimensions features specify unexpanded display dimensions and expanded display dimensions for the expandable content item. The expansion events specify one or more specified expansion events for the expandable content item, where each specified expansion event is an event for which the expanding content item is specified to expand from the unexpanded state to the expanded state. For example, an expandable content item that is to expand only for an on-load event will have the on-load event listed as a specified expansion event, and other expansion events will not be specified.

The content management system includes a detection and validation subsystem that detects the expansion events supported by the expandable content item and compares the supported expansion events to the specified expansion events. The detection and validation subsystem validates the expandable content item when the supported expansion events match the specified expansion events. For example, the content item management system will support a set of enumerated expansion events, and expandable content items may use one or more of the enumerated expansion events to trigger an expansion. The detection and validation system selects an expandable content item, and in a virtual machine instance, performs operations that cause each enumerated expansion event to occur. After the occurrence of each enumerated expansion event, the detection and validation subsystem determines whether the expandable content item expanded from the unexpanded state to the expanded state. The detection and validation subsystem validates the expandable content item only when the expandable content item expands from the unexpanded state to the expanded state for each specified expansion event, and does not expand from the unexpanded state to the expanded state for each enumerated expansion event that is not included in the one or more specified expansion events.

Content items that are validated are then released to be served to fulfill content item requests, or, alternatively, to undergo further evaluations, such as malware checks, quality checks, and other evaluations. When a particular content item request for an expandable content item for a resource served by a publisher is received, the content item management system accesses filter data that specifies expansion preferences for the publisher. Only expandable content items that have been validated to expand for only the expansion events specified by the publisher are eligible to be served in response to the request.

These features and other features are described in more detail below.

Example Environment

Figure 1:
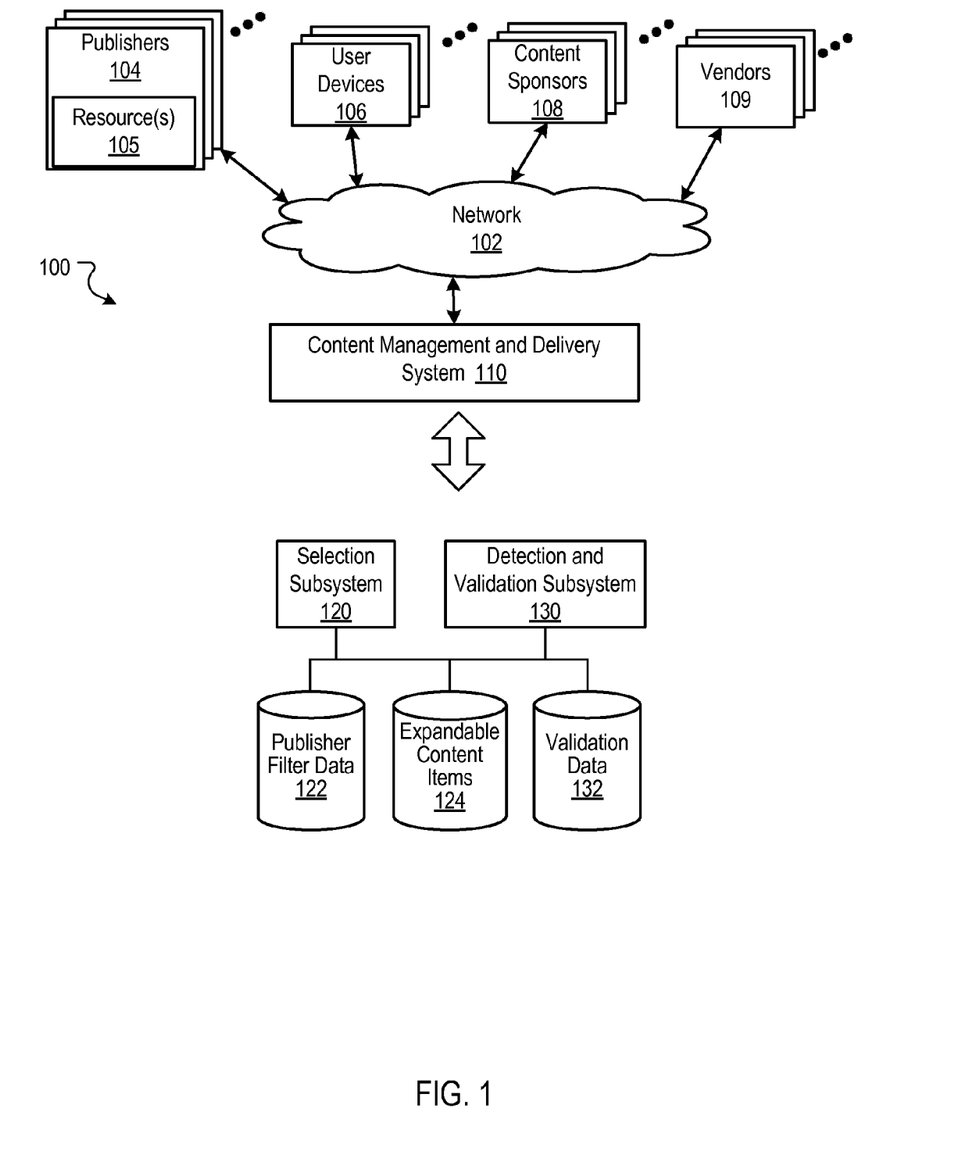
FIG. 1 is a block diagram of an example environment for delivering content.

FIG. 1 is a block diagram of an example environment 100 for delivering content. The example environment 100 includes a content management and delivery system 110 for selecting and providing content to user devices. The example environment 100 includes a network 102, such as wide area network (WAN), the Internet, or a combination thereof. The network 102 connects publisher 104, user devices 106, content sponsors 108 (e.g., advertisers that use vendors to serve advertisements), vendors 109, and the content management and delivery system 110. The example environment 100 may include many thousands of publishers 104, user devices 106, content sponsors 108.

In some implementations, the content management and delivery system 110 includes a request handler that can receive a request for content from a user device, identify one or more eligible content items, and provide a content item responsive to the request.

A publisher 104 typically manages a website that includes one or more resources 105 associated with a domain name and hosted by one or more servers. An example website is a collection of web pages formatted in hypertext markup language (HTML) that can contain text, images, multimedia content, and programming elements, such as scripts. Each publisher 104 is an entity that controls, manages and/or owns the website.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript scripts). In some implementations, the resources 105 can include sponsored content provided by the content sponsors 108 and that can be rendered in specific locations in the resource. For example, the resources 105 can include an advertisement, a deal or a special offer sponsored by a content sponsor 108.

A user device 106 is an electronic device that is under control of a user and is capable of requesting and receiving resources over the network 102. Example user devices 106 include personal computers, televisions with one or more processors embedded therein or coupled thereto, set top boxes, mobile communication devices (e.g., smartphones), tablet computers, e-readers, laptop computers, personal digital assistants (PDA), and other devices that can send and receive data over the network 102. A user device 106 typically includes one or more user applications, such as a web browser, to facilitate the sending and receiving of data over the network 102.

A user device 106 can request resources 105 from a publisher 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., content item slots, or, in the case of advertisement content items, advertisement slots).

When a resource 105 is requested by a user device 106 and the resource includes a content item slot in which a content item of a sponsor is to be rendered, the content management system 110 receives a request for a content item. The request for the content item can include characteristics of the slots that are defined for the requested resource.

The content management and delivery system 110 can select from the eligible content items that are to be provided to the user device 106 based at least in part, for example, on results of an auction (or in combination with content item selection process, described in more detail below). For example, for the eligible content items, the content management and delivery system 110 can receive offers from content sponsors 108 and allocate or prioritize delivery of the content items, based at least in part on the received offers (e.g., based on the highest bidders at the conclusion of the auction or based on other criteria, such as those related to satisfying open reservations).

For situations in which the systems discussed here collect personal information about users, the users may be provided with an opportunity to opt in/out of programs or features that may collect personal information (e.g., information about a user's social network, social actions or activities, profession, a user's preferences, or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. In some implementations, users can opt out of being characterized or targeted for content, including advertisements, based on the interest profiles for which they may be characterized.

Figure 2A:
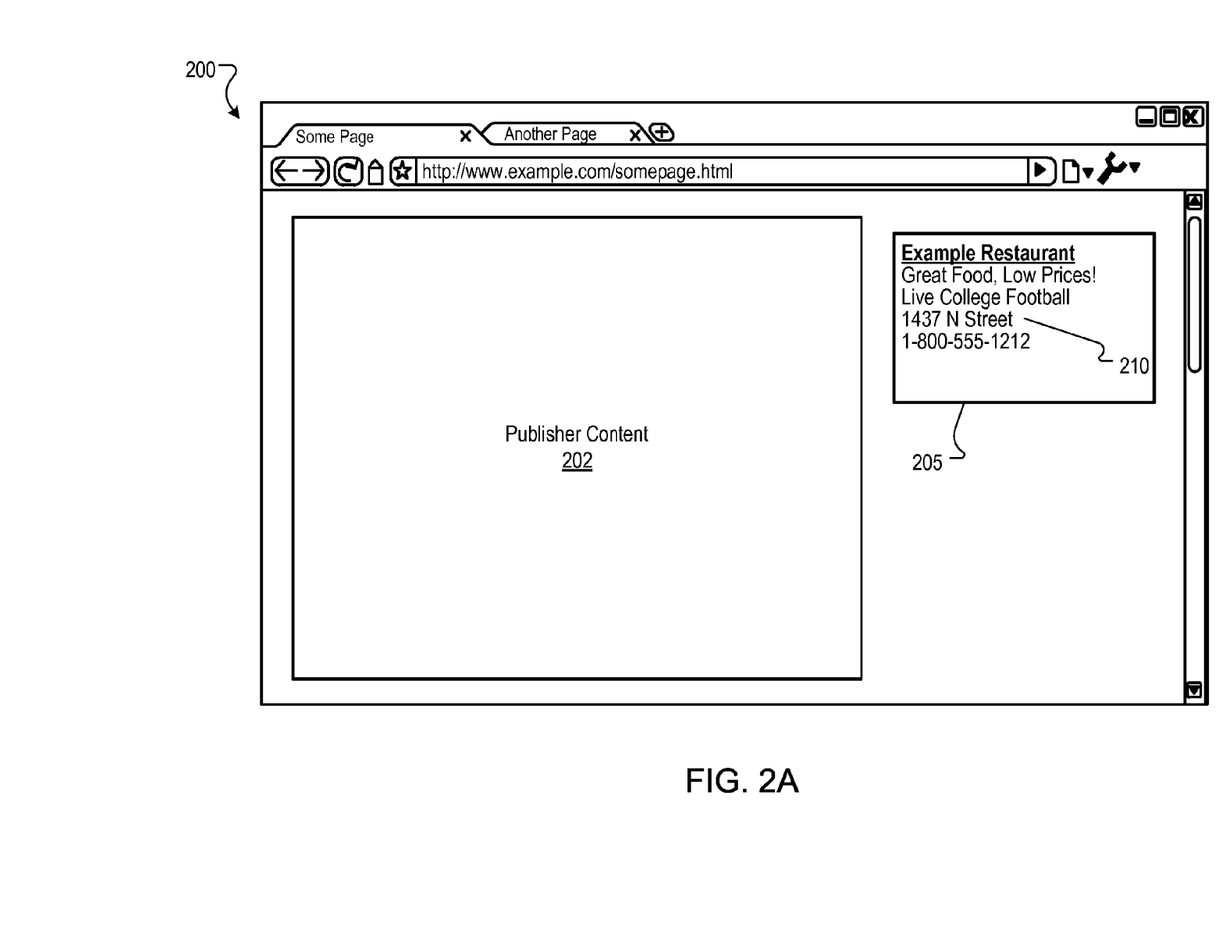
FIG. 2A depicts a browser displaying a sponsored content item.

FIG. 2A shows an example user interface 200 in which content (such as sponsored content or requested content, or both) is provided to a user device 106. For example, the resource can include specific publisher content 202 that is authored by the publisher. Additionally, resource includes a content item slot 205 in which a content item from a third party can be rendered. The content management and delivery system 110 can provide the third-party content item (e.g., advertisements, etc.) from a pool of available content items.

In some implementations, the one or more content items 210 that are selected can be selected by conducting an auction. The content items that are eligible to participate in the auction can be selected by various targeting criteria, such as interest profiles, the relevance of content items to the publisher content 202, to a time of the day, geographical location, keywords, to name a few examples.

Figure 2B:
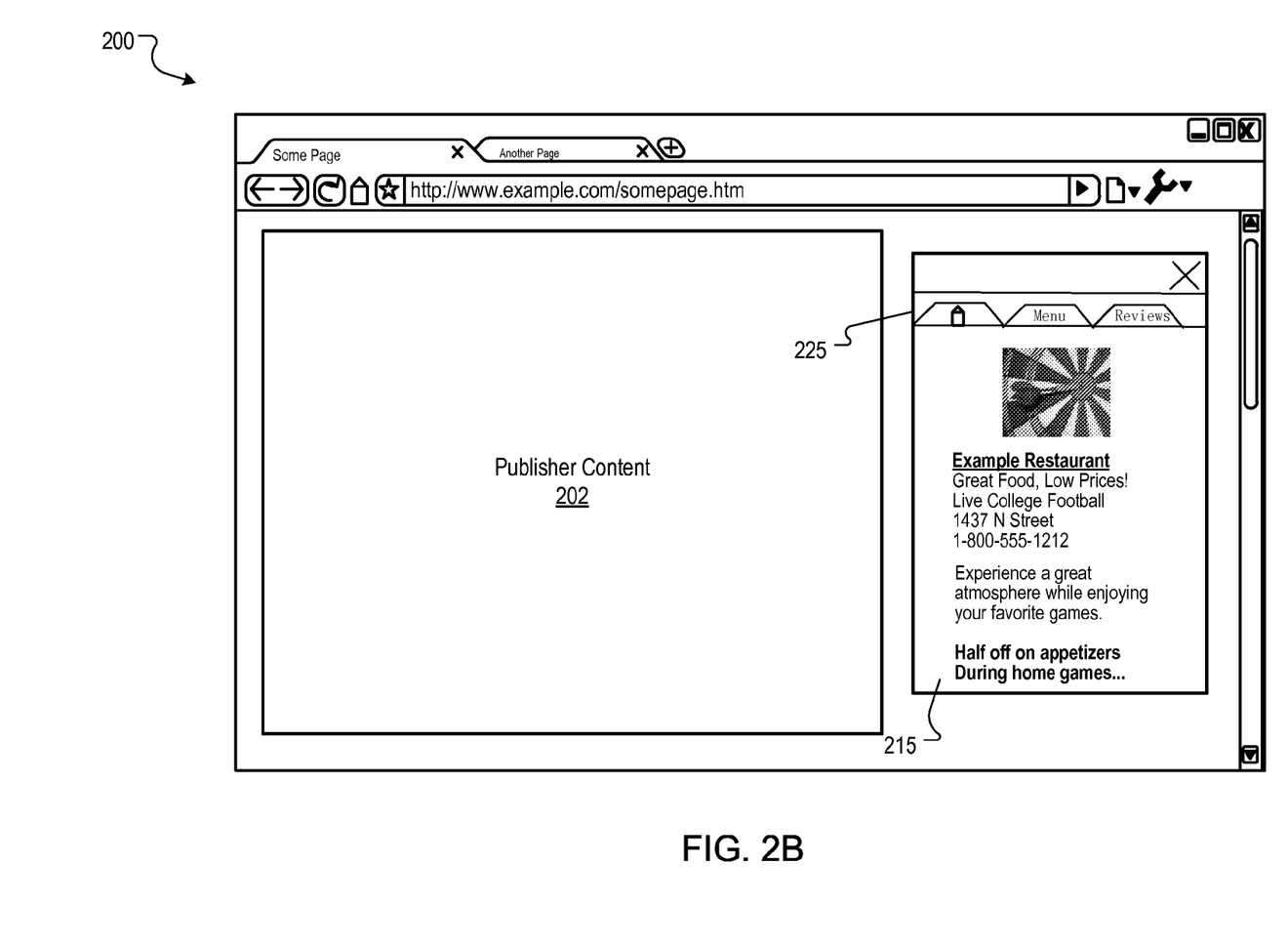
FIG. 2B depicts a browser displaying an expanded version of the sponsored content item.

In the case of expandable content items, an unexpanded version of the content item is initially rendered in the content item slot 205. Depending on the expansion event for which the expandable content item is configured, the expandable content item may expand on the page load (or shortly after the page loads, such as after a timed delay), or in response to a user interaction, such as a mouse over or click. For example, an expanded version 215 of the content item 210 is shown in the example of FIG. 2B. The expanded version 215 displays additional information. The expanded version 215 can include additional content, for example, images, larger text, audio, video, or web-based content. In one example, the content item 210 is presented first as an advertisement in textual format while enabling the user to expand the advertisement into a menu-driven, graphical advertisement in the expanded version 215. The expanded content item 215 can also include a marker that the user can click or otherwise select such that the expanded content item 215 is replaced by the unexpanded content item 210.

Filtering on Expansion Types

The content management and delivery system 110 includes a selection subsystem 120 that selects content items for content item requests. As described above, the selection process may include an auction. Additionally, the selection process may include filtering expandable content items based on publisher filter data 122. Some publishers may specify allowable expansion events for their resources. For example, some publishers may not allow on-load expansions, but may allow other expansions; while other publisher may only allow hover expansions, etc. The preferences of the publishers 104 are stored in publisher filter data 122.

During the selection process, the selection subsystem 120 accesses the publisher filter data 122, expandable content item data 124, and validation data 132. The expandable content item data 124 includes metadata describing features of the expandable content item, such as dimension features and one or more specified expansion events. The dimension features specify, for example, unexpanded display dimensions for the expandable content item in an unexpanded state and expanded display dimensions for the expandable content item in an expanded state. Each specified expansion event is one of a set of enumerated expansion events, e.g., one of a set of all allowable expansion events for the content management and delivery system. For example, if the three allowable expansion events are on-load, hover and click, then the three enumerate expansion events are an on-load event, a hover event, and a click event. Each specified expansion event for the content item is an event for which the expanding content item is specified to expand from the unexpanded state to the expanded state. For example, if the metadata for a particular content item specifies only a click expansion event, then the content item should only expand in response to a click event, and should not expand in response to an on-load event or a hover event.

Some expansion events, however, may be incorrectly specified for a content item. Thus the selection subsystem 120 also accesses validation data 132 that specifies which content items have been validated to perform in accordance with their respectively specified expansion events. In some implementations, a content item is determined to be validated when it expands for it specified expansion events and does not expand for enumerated expansion events that are not specified.

There are multiple publishers 104 and vendors 109, and each may provide hundreds or even thousands of expandable content items. Thus, a manual review of expandable content items is labor intensive and time consuming. Accordingly, the content management and delivery system 110 includes a detection and validation subsystem 130. The detection and validation system 130 detects expansion events for which an expandable content item expands, and compares the detected expansion events to the expansion events specified in the content item metadata. If the item expandable content item is determined to expand for each specified expansion event, and to not expand for each enumerated expansion event that is not included in the specified expansion events, then the content item is validated. Otherwise, the content item is not validated. The validation status of each expandable content item is stored in the validation data 132.

Detection and Validation of Expansion Types

In some implementations, the detection and validation subsystem generates one or more instances of a virtual machine (e.g., a software implementation of a computer that executes programs as a physical machine) and creates a resource in which an expandable content item awaiting validation is rendered. In some implementations, the resource is an HTML document with only the necessary instructions required to properly render and display the expandable content item. Additional content that is not part of the expandable content item, such as publisher content, images, etc., need not be rendered in the resource. For example, the resource may be a URL hosted by the content management and delivery system, and may include only a content item slot (e.g., an iFrame, or some other environment) in which the content item is rendered.

Figure 3:
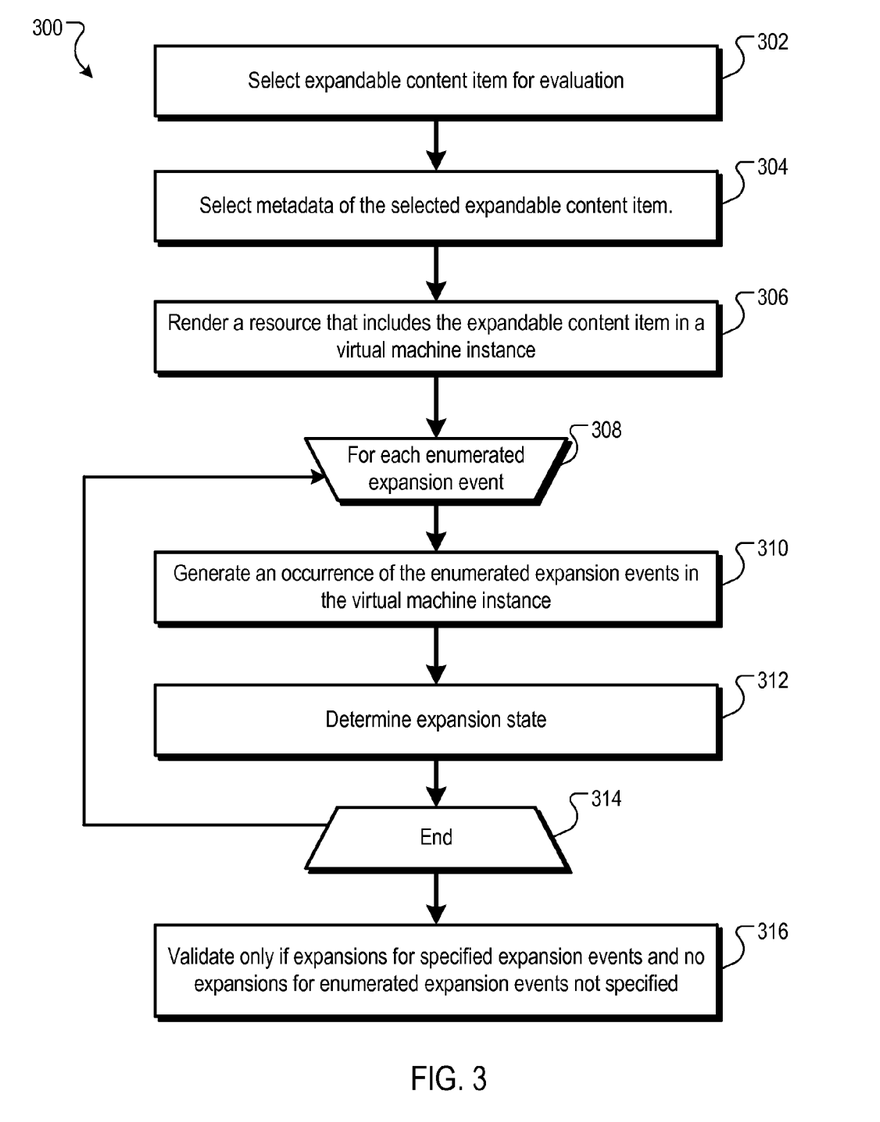
FIG. 3 is a flow diagram of an example process for detecting and validating declared expansion types for an expandable content item.

Operation of an example process 300 for detecting and validating declared expansion types for an expandable content item is describe with reference to FIG. 3. The process 300 is implemented in a data processing apparatus of one or more computers in the detection and validation subsystem 130.

The process 300 selects an expandable content item for evaluation (302). For example, the detection and validation subsystem 130 selects newly submitted content items, and/or content items that have yet to be evaluated.

The process 300 selects metadata of the expandable content item 302. For example, as described above, the metadata includes specified expansion events for the expandable content item, where each specified expansion event is one of a set of enumerated expansion events for which the occurrence causes an expandable content item to expand from an unexpanded state to an expanded state. The metadata may also include dimension features specifying at least one of unexpanded display dimensions for the expandable content item in an unexpanded state and expanded display dimensions for the expandable content item in an expanded state.

The process 300 renders, in the virtual machine instance, a resource that includes the expandable content item (306). For example, the detection and validation system renders the resource in memory in the same manner that a user device would render the resource, e.g., by the virtual machine issuing an HTTP request for the resource, receiving the resource and rendering the resource in a browser instance.

The process 300 then evaluates the expandable content item for each enumerated instance (308). In some implementations, the enumerated expansion events are evaluated hierarchically. For example, for the three enumerated events of on-load, hover, and click, the on-load event is evaluated first, followed by the hover event, and finally by the click event.

For the enumerated expansion event, the process 300 generates an occurrence of the expansion event in the virtual machine instance (310). For example, for the on-load event, the expansion event is generated during the rendering of the resource. For the hover event, the detection and validation system 130, for example, moves a cursor over a location of the rendered expandable content item. The location may be determined, for example, from the document object model that corresponds to the expandable content item, and from the dimensions of the expandable content item in the unexpanded state.

Additional detection processing may be required for a click event, as an expandable content item may have a particular user interface element that causes the content item to expand when selected, and selection of other portions of the expandable content item may cause a client device to navigate to a landing page of a sponsor of the content item (e.g., the landing page of an advertiser for an advertisement. Thus, for the click event, the detection and validation system 130 generates one or more click emulations on the expandable content item. Each click emulation represents a click at a particular location on the content item. After each click, the detection and validation system 130 determines if the content item has expanded, the virtual machine has navigated to another resource, or if no operation occurred. In the case of the latter navigating to another resource, the resource with the expandable content item is re-rendered and another click emulation is generated at another location on the resource. The process continues until one of an expansion is detected or a cessation event occurs. A cessation event may occur if, for example, a maximum number of click emulations is generated and no expansion has occurred.

In some implementations, the detection and validation system 130 partitions the area of the unexpanded content item (as defined by its unexpanded display dimensions) into a set of sub-areas. Each sub-area is a non-overlapping area that is of approximately commensurate area, or smaller, of a relatively small selectable user interface element, such as an expansion button. For example, sub-areas of approximately 10×10 pixels may be defined, and a click event may be generated for each sub-area until all sub areas have been checked, or until an expansion occurs. Thus, by processing the sub-area, the likelihood of missing an expansion user interface element is reduced.

The process 300, after each occurrence of an enumerate expansion event, determines the expansion state of the content item. One example process of determining an expansion state is described with reference to FIG. 4 below. The expansion state is then associated with the enumerated event for the content item. In the case of multiple click events, the expansion state is associated with the click event after the occurrence of the cessation event or after the occurrence of the content item expanding from the unexpanded state to the expanded state.

The process 300, after all enumerated events are evaluated (314), validates the content item only if expansions occur for specified expansion events and no expansions occur for enumerated expansion events not specified in the specified expansion events. For example, if a content item has specified in its metadata only a hover event as an expansion event, and the content item expands for the hover event and does not expand for any other enumerated event, the detection and validation subsystem validates the content item. Otherwise, the content item is not validated.

The validated content items are then eligible for a selection process, such as an auction, to fulfill requests. The content items that are not validated, on the other hand, are precluded from participating in the selection process.

Figure 4:
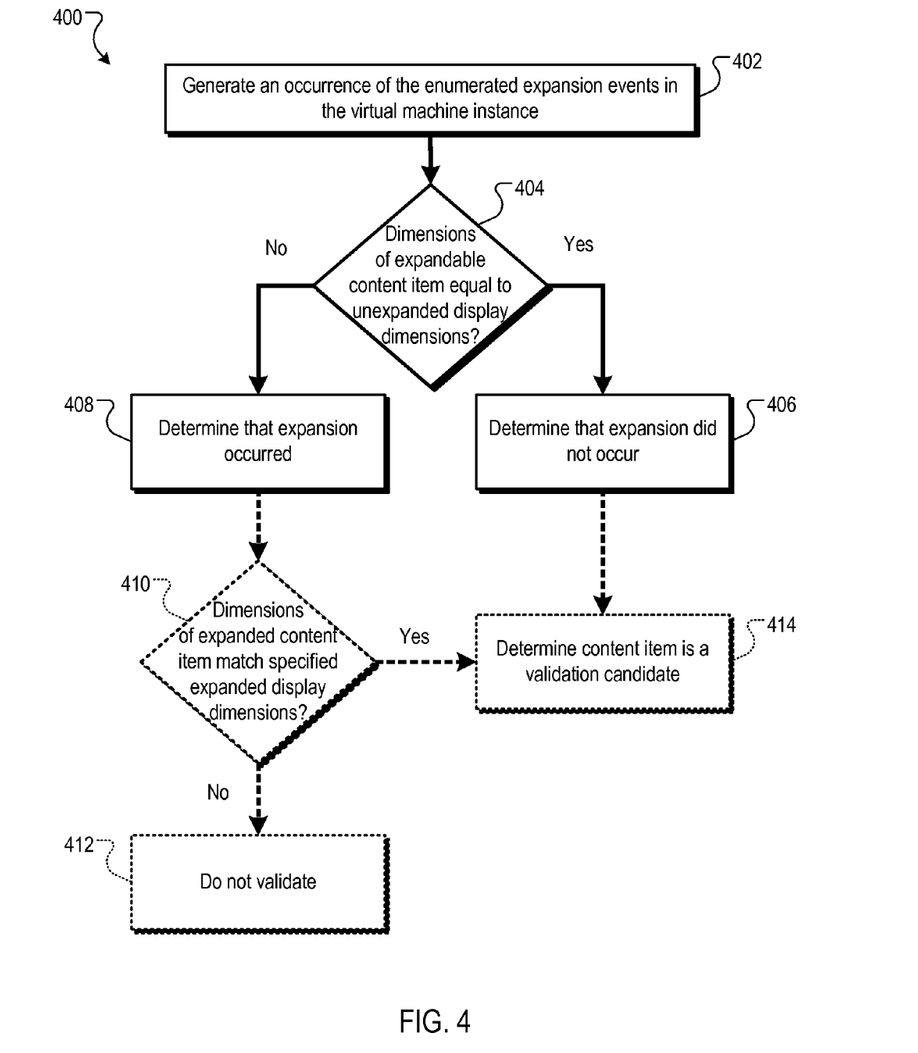
FIG. 4 is a flow diagram of an example process for detecting and validating an expansion characteristic for an enumerated event.

FIG. 4 is a flow diagram of an example process 400 for detecting and validating an expansion characteristic for an enumerated event. The example process is but one way that a system can detect whether an expandable content item has expanded, and other appropriate techniques can also be used.

The process 400 generates an occurrence of an enumerated expansion event in the virtual machine instance (402). For example, for the on-load event, the expansion event is generated during the rendering of the resource; for the hover event, the detection and validation system 130, for example, moves a cursor over a location of the rendered expandable content item; and for the click event, the detection and validation system 130 generates a click on the expandable content item.

The process 400 determines if the dimensions of the expandable content item equal the unexpanded display dimensions (402). For example, the expandable content item determines whether a document object model element corresponding to the expandable content item has dimensions that equal the dimensions of the unexpanded display dimensions specified in the metadata.

If the dimensions are equal, then the process 400 determines than an expansion did not occur (406). Conversely, if the dimensions are not equal, e.g., the dimensions of the DOM element are greater than the unexpanded display dimensions, then the process 400 determines that an expansion did occur (408).

In some implementations, additional processing steps to check additional features can also be performed. One such feature is an accuracy check on the expanded display dimensions. For example, the process 400, after determining an expansion occurred, determines if the dimensions of the expanded content item match the specified expanded display dimensions (410). In an alternative implementation, the dimensions of the expanded content item are compared to sets of predefined expanded display dimensions. The predefined expanding display dimensions are allowable display dimensions that may be used for any expandable content item, e.g., 120×240, 120×360, 240×120, 240×240, etc.

A negative determination precludes the expandable content item from being validated (412). In some implementations, expandable content items that receive negative determinations can be flagged for additional review, e.g., by human evaluators. A positive determination, on the other hand, results in the process 400 determining that the content item is a validation candidate (414). Content items that are validation candidates continue to be evaluated for any remaining expansion events.

Variations of the process 400 may also be used. For example, the detection and validation subsystem 130 may be configured to determine that a content item has expanded from the unexpanded state to the expanded state when the dimensions of the expandable content item rendered in the virtual machine are greater than the unexpanded display dimensions. In still other variations, the detection and validation subsystem 130 may determine the dimensions of a content item at rendering, and prior to the content item being able to expand in response to an on-load event, and save these dimensions as initial dimensions. Thereafter, after each occurrence of an enumerated expansion event, the detection and validation subsystem 130 will determine that a content item expanded when the dimensions are larger than the initial dimensions. Still other less than, equal to or greater than comparisons of the dimensions before and after each occurrence of an enumerated event can also be used to make the determinations. In additional implementations, any modifications to the DOM elements of the resource can be considered an expansion event.

Additional Implementation Details

Figure 5:
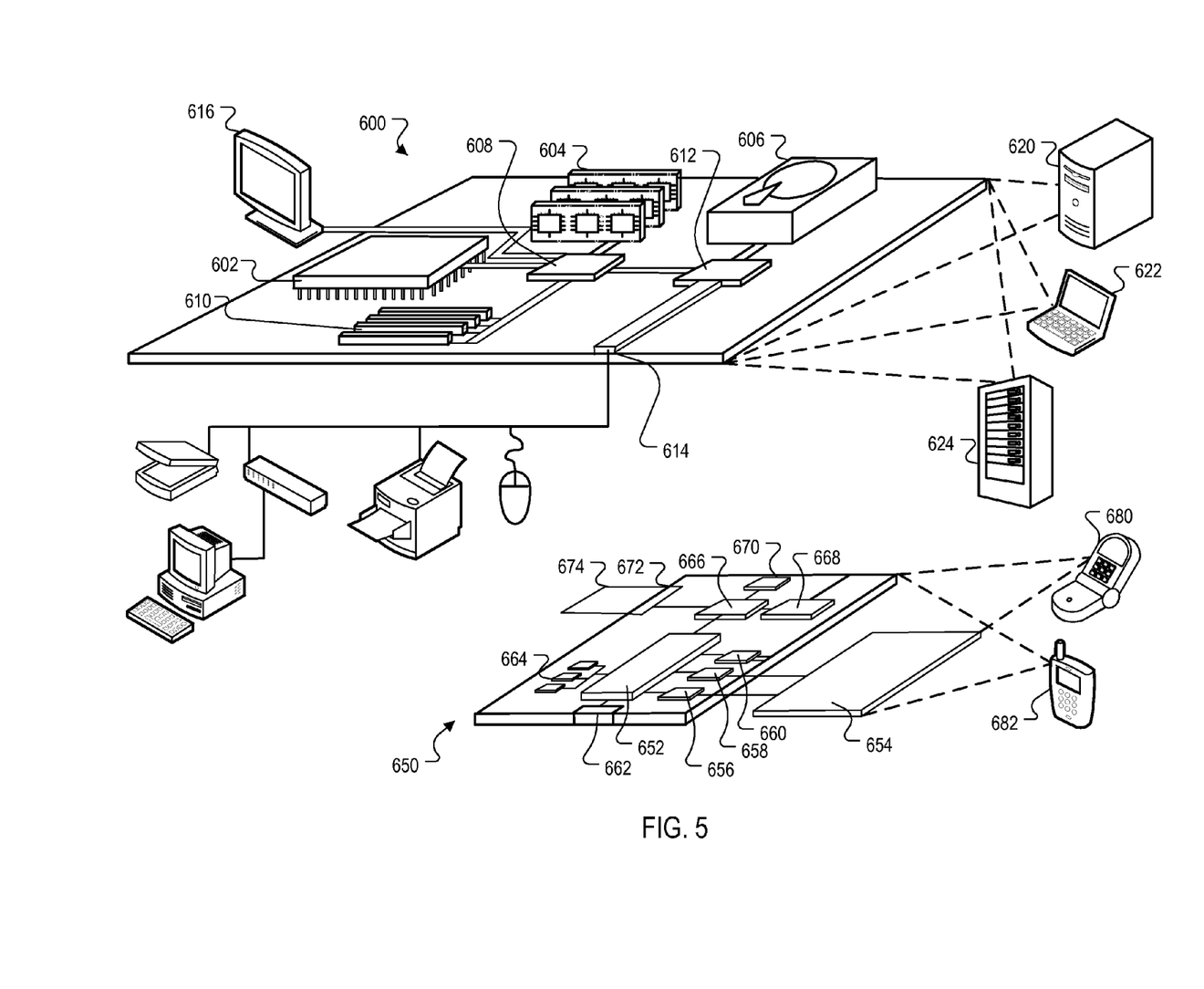
FIG. 5 is a block diagram of an example computer system that can be used to implement the methods, systems and processes described in this disclosure.

FIG. 5 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 600 is further intended to represent various typically non-mobile devices, such as televisions or other electronic devices with one or more processors embedded therein or attached thereto. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. A machine-readable medium or a computer-readable medium does not include a transitory signal.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    selecting, by data processing apparatus, expandable content items, and for each expandable content item;
        selecting, by the data processing apparatus, metadata describing features of the expandable content item, the metadata describing features including:
            dimension features specifying at least one of unexpanded display dimensions for the expandable content item in an unexpanded state and expanded display dimensions for the expandable content item in an expanded state;
            one or more specified expansion events for the expandable content item, each specified expansion event being one of a set of enumerated expansion events, each enumerated expansion event being an event for which the occurrence causes an expandable content item to expand from an unexpanded state to an expanded state, each specified expansion event being an event for which the expanding content item is specified to expand from the unexpanded state to the expanded state;
        rendering a resource that includes the expandable content item in a virtual machine instance;
        generating an occurrence of each of the enumerated expansion events in the virtual machine instance, and after the occurrence of each enumerated expansion event, determining whether the expandable content item expanded from the unexpanded state to the expanded state; and
        validating the expandable content item only when the expandable content item expands from the unexpanded state to the expanded state for each specified expansion event, and does not expand from the unexpanded state to the expanded state for each enumerated expansion event that is not included in the one or more specified expansion events.

2. The method of claim 1, wherein:
the dimension features specify unexpanded display dimensions; and
determining whether the expandable content item expanded from the unexpanded state to the expanded state comprises:
    determining that the expandable content item rendered in the virtual machine instance did not expand when the dimensions of the expandable content item rendered in the virtual machine are equal to the unexpanded display dimensions; and
    determining that the expandable content item rendered in the virtual machine instance did expand when the dimensions of the expandable content item rendered in the virtual machine are greater than the unexpanded display dimensions.

3. The method of claim 1, further comprising:
validating the expandable content item further comprises validating the expandable content item only when dimensions of the expanded content item match dimensions selected from a set of predefined expanded display dimensions.

4. The method of claim 3, wherein:
the dimension features further specify expanded display dimensions; and
validating the expandable content item further comprises validating the expandable content item only when dimensions of the expanded content item match the expanded display dimensions.

5. The method of claim 3, wherein determining that the expandable content item rendered in the virtual machine instance did expand comprises:
    identifying in the resource a document object model element corresponding to a visual element and having display dimensions that are larger than the display dimensions of all other document object model elements corresponding to a visual element; and
    determining that the expandable content item rendered in the virtual machine instance did expand when the display dimensions are larger than the unexpanded display dimensions specified by the dimension features of the expandable content item.

6. The method of claim 1, wherein:
the dimension features specify expanded display dimensions; and
determining whether the expandable content item expanded from the unexpanded state to the expanded state comprises:
  determining that the expandable content item rendered in the virtual machine instance did not expand when the dimensions of the expandable content item rendered in the virtual machine are less than the unexpanded display dimensions; and
  determining that the expandable content item rendered in the virtual machine instance did expand when the dimensions of the content item rendered in the virtual machine are equal to the expanded display dimensions.

7. The method of claim 1, wherein:
the enumerated expansion events include an on-load event, a hover event, and a click event.

8. The method of claim 1, wherein the expandable content item is an expandable advertisement.

9. The method of claim 1, further comprising precluding from a content item request selection process each expandable content item that is not validated.

10. A system, comprising:
a data processing apparatus comprising one or more computers; and
a non-transitory computer memory apparatus in data communication with the data processing apparatus and storing instructions executable by the data processing apparatus and that upon such execution cause the data processing apparatus to perform operations comprising:
selecting expandable content items, and for each expandable content item;
  selecting metadata describing features of the expandable content item, the metadata describing features including:
    dimension features specifying at least one of unexpanded display dimensions for the expandable content item in an unexpanded state and expanded display dimensions for the expandable content item in an expanded state;
    one or more specified expansion events for the expandable content item, each specified expansion event being one of a set of enumerated expansion events, each enumerated expansion event being an event for which the occurrence causes an expandable content item to expand from an unexpanded state to an expanded state, each specified expansion event being an event for which the expanding content item is specified to expand from the unexpanded state to the expanded state;
  rendering a resource that includes the expandable content item in a virtual machine instance;
  generating an occurrence of each of the enumerated expansion events in the virtual machine instance, and after the occurrence of each enumerated expansion event, determining whether the expandable content item expanded from the unexpanded state to the expanded state; and
  validating the expandable content item only when the expandable content item expands from the unexpanded state to the expanded state for each specified expansion event, and does not expand from the unexpanded state to the expanded state for each enumerated expansion event that is not included in the one or more specified expansion events.

11. The system of claim 10, wherein:
the dimension features specify unexpanded display dimensions; and
determining whether the expandable content item expanded from the unexpanded state to the expanded state comprises:
  determining that the expandable content item rendered in the virtual machine instance did not expand when the dimensions of the expandable content item rendered in the virtual machine are equal to the unexpanded display dimensions; and
  determining that the expandable content item rendered in the virtual machine instance did expand when the dimensions of the expandable content item rendered in the virtual machine are greater than the unexpanded display dimensions.

12. The system of claim 10, the operations further comprising:
validating the expandable content item further comprises validating the expandable content item only when dimensions of the expanded content item match dimensions selected from a set of predefined expanded display dimensions.

13. The system of claim 12, wherein:
the dimension features further specify expanded display dimensions; and
validating the expandable content item further comprises validating the expandable content item only when dimensions of the expanded content item match the expanded display dimensions.

14. The system of claim 12, wherein determining that the expandable content item rendered in the virtual machine instance did expand comprises:
identifying in the resource a document object model element corresponding to a visual element and having display dimensions that are larger than the display dimensions of all other document object model elements corresponding to a visual element; and
determining that the expandable content item rendered in the virtual machine instance did expand when the display dimensions are larger than the unexpanded display dimensions specified by the dimension features of the expandable content item.

15. The system of claim 10, wherein:
the dimension features specify expanded display dimensions; and
determining whether the expandable content item expanded from the unexpanded state to the expanded state comprises:
  determining that the expandable content item rendered in the virtual machine instance did not expand when the dimensions of the expandable content item rendered in the virtual machine are less than the unexpanded display dimensions; and
  determining that the expandable content item rendered in the virtual machine instance did expand when the dimensions of the content item rendered in the virtual machine are equal to the expanded display dimensions.

16. The system of claim 10, wherein:
the enumerated expansion events include an on-load event, a hover event, and a click event.

17. The system of claim 10, wherein the expandable content item is an expandable advertisement.

18. The system of claim 10, further comprising precluding from a content item request selection process each expandable content item that is not validated.

19. A non-transitory computer memory apparatus storing instructions executable by a data processing apparatus and that upon such execution cause the data processing apparatus to perform operations comprising:
- selecting expandable content items, and for each expandable content item;
    - selecting metadata describing features of the expandable content item, the metadata describing features including:
    - dimension features specifying at least one of unexpanded display dimensions for the expandable content item in an unexpanded state and expanded display dimensions for the expandable content item in an expanded state;
    - one or more specified expansion events for the expandable content item, each specified expansion event being one of a set of enumerated expansion events, each enumerated expansion event being an event for which the occurrence causes an expandable content item to expand from an unexpanded state to an expanded state, each specified expansion event being an event for which the expanding content item is specified to expand from the unexpanded state to the expanded state;
    - rendering a resource that includes the expandable content item in a virtual machine instance;
    - generating an occurrence of each of the enumerated expansion events in the virtual machine instance, and after the occurrence of each enumerated expansion event, determining whether the expandable content item expanded from the unexpanded state to the expanded state; and
    - validating the expandable content item only when the expandable content item expands from the unexpanded state to the expanded state for each specified expansion event, and does not expand from the unexpanded state to the expanded state for each enumerated expansion event that is not included in the one or more specified expansion events.

20. The non-transitory computer memory apparatus of claim 19, wherein:
- the dimension features specify unexpanded display dimensions; and
- determining whether the expandable content item expanded from the unexpanded state to the expanded state comprises:
    - determining that the expandable content item rendered in the virtual machine instance did not expand when the dimensions of the expandable content item rendered in the virtual machine are equal to the unexpanded display dimensions; and
    - determining that the expandable content item rendered in the virtual machine instance did expand when the dimensions of the expandable content item rendered in the virtual machine are greater than the unexpanded display dimensions.

* * * * *